Figure 1:
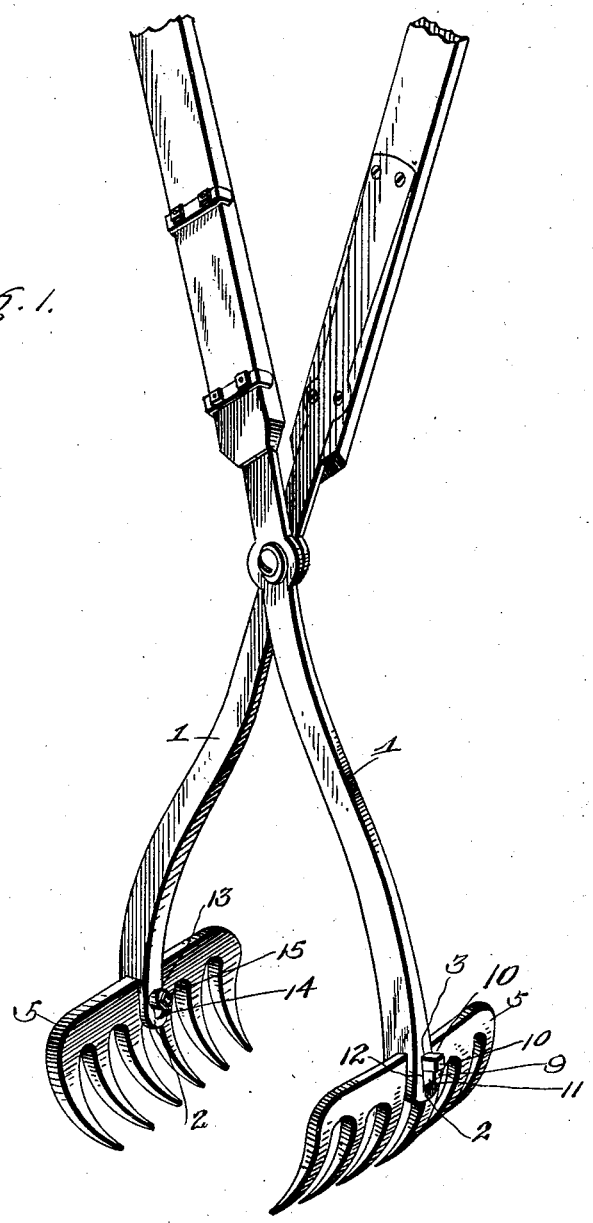

No. 694,495.  
M. QUINN.  
TONGS.  
(Application filed Dec. 19, 1901.)

Patented Mar. 4, 1902.

(No Model.)

2 Sheets—Sheet 1.

Witnesses  
Inventor  
Martin Quinn  
By  
Attorneys

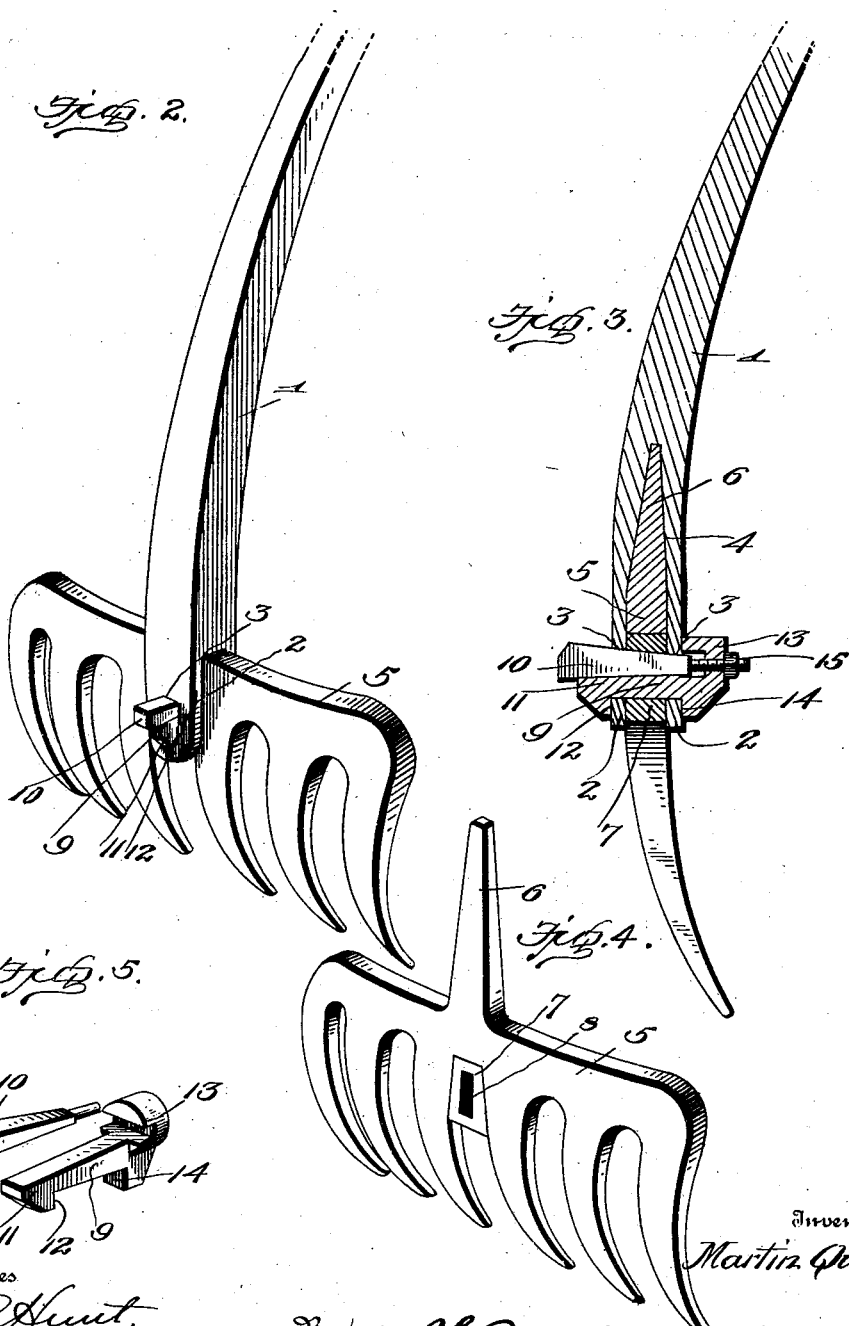

United States Patent Office.

MARTIN QUINN, OF BLACKROCK, ARKANSAS.

TONGS.

SPECIFICATION forming part of Letters Patent No. 694,495, dated March 4, 1902.

Application filed December 19, 1901. Serial No. 86,532. (No model.)

*To all whom it may concern:*

Be it known that I, MARTIN QUINN, a citizen of the United States, residing at Blackrock, in the county of Lawrence and State of Arkansas, have invented certain new and useful Improvements in Tongs; and I do declare the following to be a full, clear, and exact description of the invention, such as will enable others skilled in the art to which it appertains to make and use the same.

This invention relates to tongs, and more particularly to that class used for gathering from river-bottoms mussels, oysters, and other shell-fish.

The object of the invention is to provide a tongs the fork-heads of which may be easily and quickly removed from the shanks of the tongs for the purpose of supplying said shanks with heads of different sizes to suit the work at hand.

With this object in view the invention consists in certain novel features of construction and combination and arrangement of parts, as will be hereinafter more fully described, defined in the appended claims, and illustrated in the accompanying drawings, in which—

Figure 1 is a perspective view of a pair of tongs. Fig. 2 is an enlarged perspective view of one member of the same. Fig. 3 is a longitudinal vertical sectional view taken through the parts. Fig. 4 is a detail perspective view of the fork-head. Fig. 5 is a detail perspective view of the gib and key.

In the drawing, 1 denotes the shanks of a pair of tongs, each forked at its lower end to provide parallel lips 2, having alined apertures 3. The lower end of the shank above the parallel lips is provided with a chamber 4. The shanks are pivoted together and have their upper ends fitted into recesses formed in the inner faces of a pair of operating-handles and held in place in any suitable manner, as by screws and nuts, as shown in Fig. 1 of the drawings.

5 denotes the fork-head of the tongs provided with a tang 6, which is adapted to fit said chamber and having located between its two central teeth or tines a wedge-shaped block 7, which is provided with an aperture 8, which is caused to register with the apertures of the lips. This block serves to prevent the entrance of dirt, sand, and other foreign matter between the lips and the consequent binding of the parts, thus serving the purpose of a filling-block.

9 denotes the gib, and 10 the key. The gib is formed at one end with a beveled head 11, having an abrupt shoulder 12. The bevel on said head facilitates the introduction of the gib through the apertures of the lips and block by crowding past the same if not truly alined, and the shoulder is designed to engage and project over the end wall of the outermost lip. The opposite end of this gib is provided with an offset apertured head 13 and with a brace-knee 14, which are adapted to engage the inner side of the innermost lip.

The key 10 is tapered and is adapted to be inserted from the outside through the apertures of the lips and block and is provided with a screw-threaded extension which passes through the aperture in the head of the gib and receives a binding-nut 15, which securely holds the parts in clamped position after the key has been driven home.

When it is desired to remove the fork-head for the purpose of replacing it with one of a different size, the nut is loosened, the key driven out, the gib removed, and the tang of the fork-head withdrawn from its socket and a fork-head of a different size placed in position in the manner above described.

From the foregoing description, taken in connection with the accompanying drawings, it is thought that the construction, operation, and advantages of the invention will be readily apparent without requiring an extended explanation.

Various changes in the form, proportion, and the minor details of construction may be resorted to without departing from the principle or sacrificing any of the advantages of this invention, and I therefore reserve to myself the right to make such changes as fairly fall within the scope thereof.

Having thus described the invention, what is claimed, and desired to be secured by Letters Patent, is—

The combination with the shank of a pair of tongs, said shank being provided with parallel lips having alined apertures; of a fork-head placed between said lips, a gib inserted in said apertures and provided with a shoulder at one end and a perforated head at the opposite end, and a key inserted through said apertures and having a screw-threaded extension that passes through the aperture in the head of the gib, and a nut screwed upon said extension, substantially as specified.

In testimony whereof I have hereunto set my hand in presence of two subscribing witnesses.

MARTIN QUINN.

Witnesses:
JAMES W. McPHINK,
M. L. QUINN.